Oct. 19, 1926.  
H. ENARD  
CAR DUMPER  
Filed March 24, 1926.  
1,604,029  
5 Sheets-Sheet 1

INVENTOR

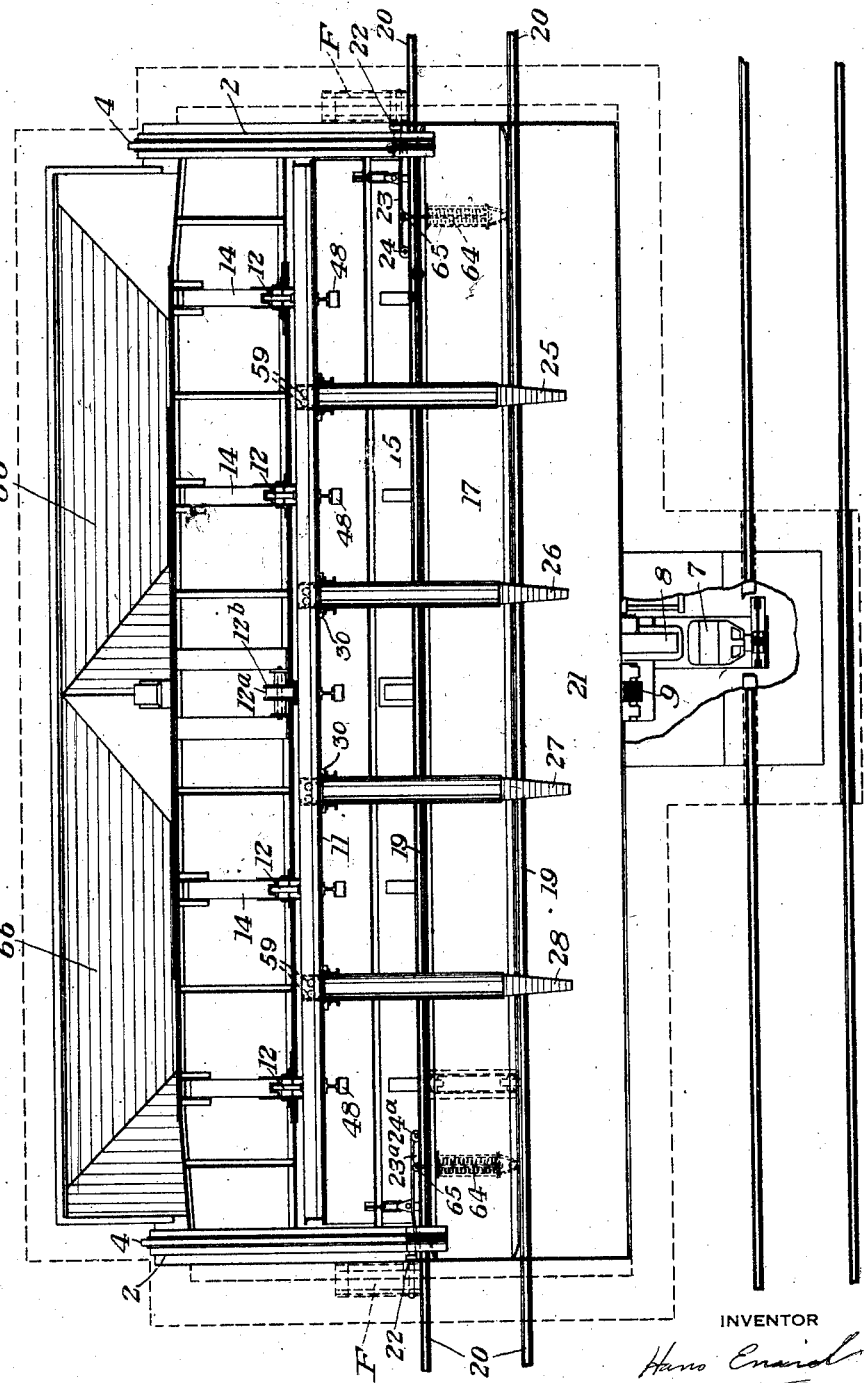

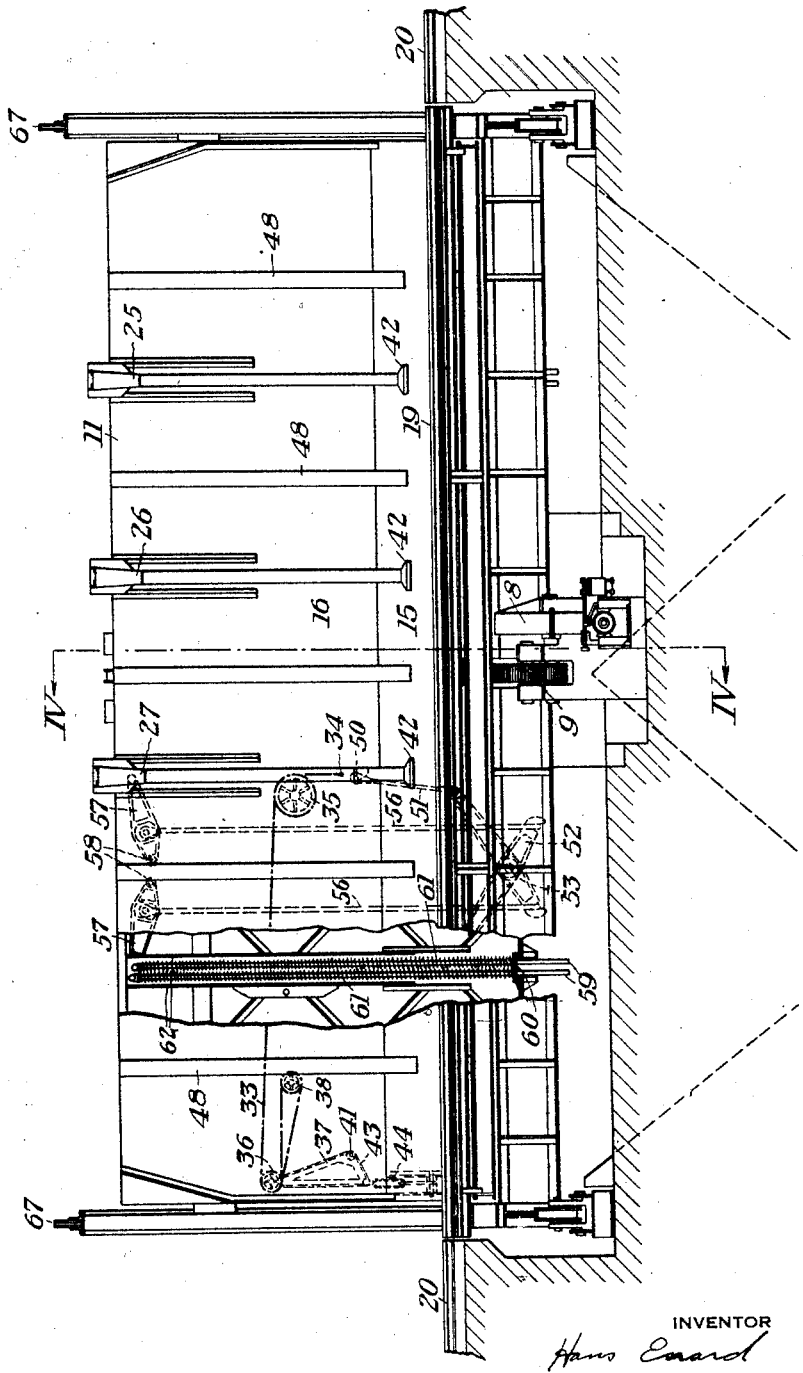

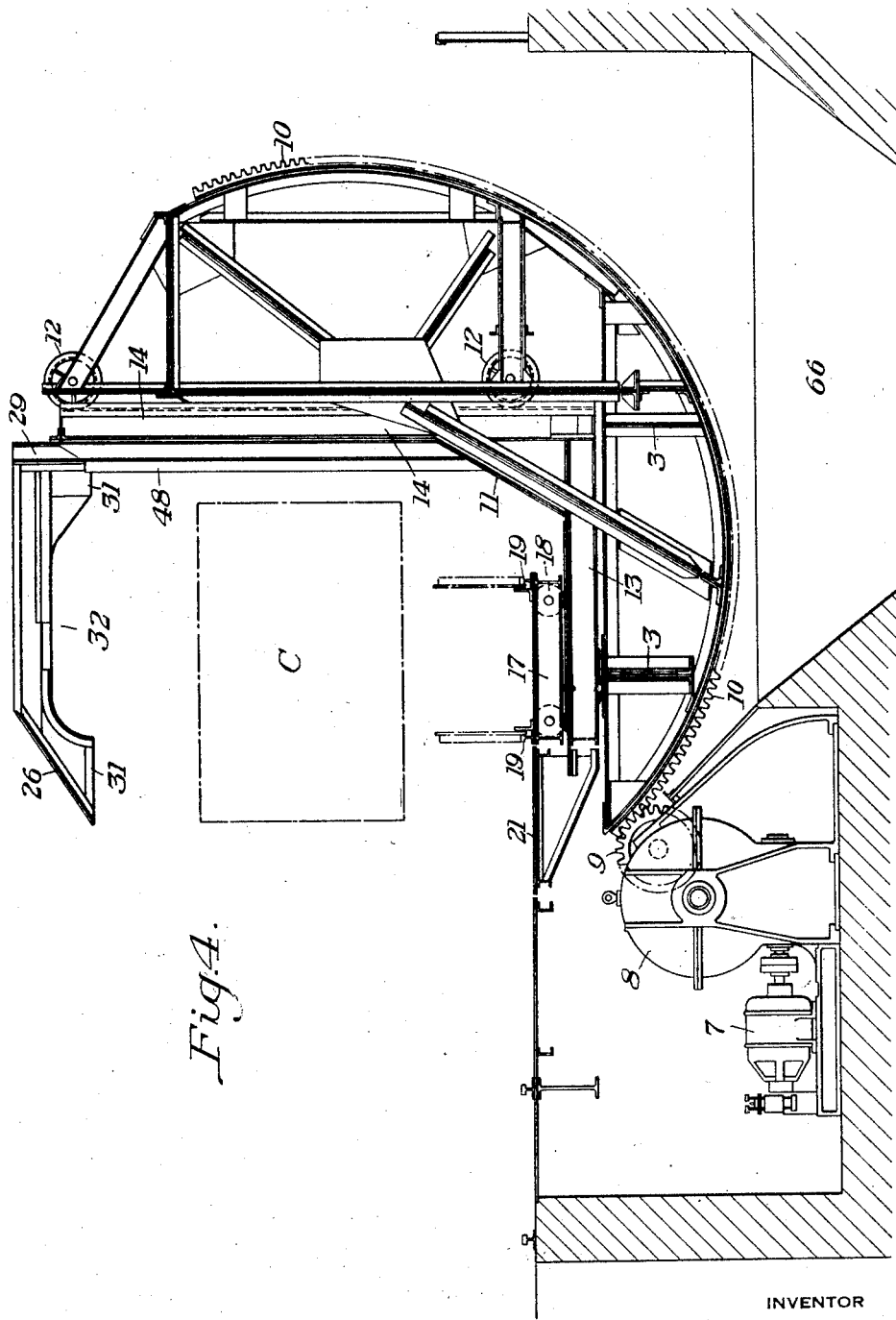

Oct. 19, 1926.
H. ENARD
1,604,029
CAR DUMPER
Filed March 24, 1926
5 Sheets-Sheet 5
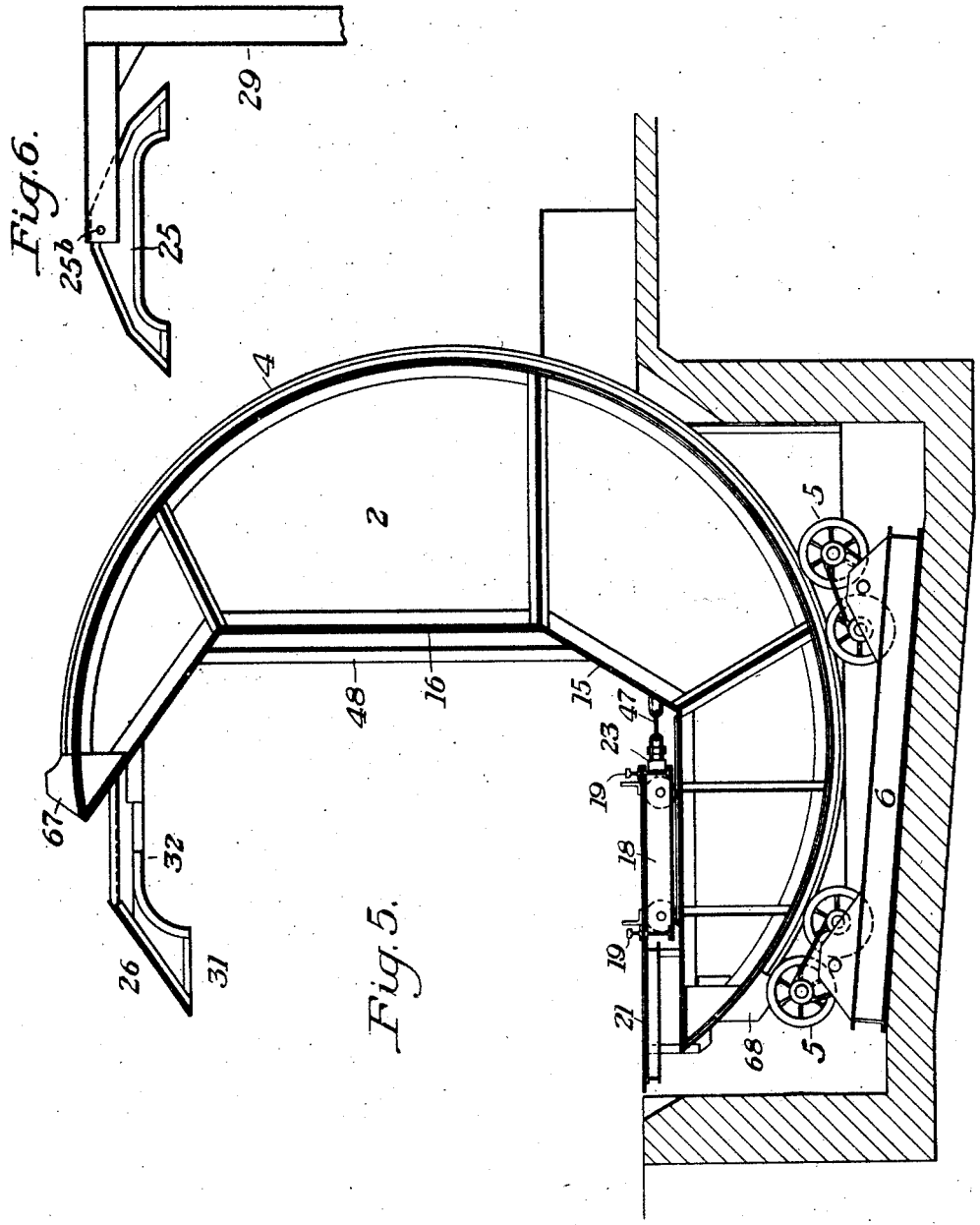
INVENTOR
Hans Enard
by his attorneys Patented Oct. 19, 1926.

1,604,029

UNITED STATES PATENT OFFICE.

HANS ENARD, OF PITTSBURGH, PENNSYLVANIA, ASSIGNOR TO HEYL & PATTERSON, INC., OF PITTSBURGH, PENNSYLVANIA, A CORPORATION OF PENNSYLVANIA.

CAR DUMPER.

Application filed March 24, 1926. Serial No. 96,988.

This invention relates to car dumpers and is particularly adaptable for use in a car dumper of the rotary type.

In the rotary type of car dumper the car to be emptied is run onto a support, clamped and then tilted. In certain cases the clamps employed have been operated by separate motors which have been controlled automatically by the rotation of the dumper or by the manipulation of electrical controllers. Other dumpers have had their clamps applied by counterweights acting through a system of levers, ropes and hold brakes. All of these constructions have been open to numerous disadvantages in construction and operation.

I provide a car dumper which has car clamping or holding means actuated by the weight of the car being dumped. With this arrangement the clamping force is automatically increased as the necessity for increased holding power increases and the entire system is simple in construction and automatic in operation.

I further provide a plurality of clamps adapted to engage the car at spaced apart points and all actuated by the weight of the car, at least one of the clamps being provided with a yielding connection which permits of uneven setting of the clamps. This is of value in that a lump of coal or other material being handled frequently gets under one of the clamps and prevents it setting on the top of the car walls as it should do.

In the preferred form the invention comprises a rotating frame having an L-shaped cradle mounted thereon, which cradle is free for movement at right angles to the plane of the rail. This cradle carries a platen on which the rails are mounted and the platen is adapted for sidewise movement. Consequently when a car is run onto the tracks of the car dumper and the main frame is rotated, the platen moves sidewise relative to the cradle or L-shaped frame until the side of the car engages the upstanding leg or side of the L-shaped frame. I utilize this movement for the preliminary moving of the clamping members toward clamping position.

Continued rotation of the main frame finally brings the car and the L-shaped frame to such a position that the L-shaped frame or cradle moves with respect to the main frame and this action is effective for applying the clamping force.

In the accompanying drawings illustrating the present preferred embodiment of my invention:

Figure 1 is a perspective view, partly broken away, of a car dumper constructed according to my invention;

Figure 2 is a top plan view;

Figure 3 is a side elevation, partly broken away;

Figure 4 is a vertical section taken on the line IV—IV of Figure 3;

Figure 5 is an end elevation, and

Figure 6 is a side elevation of a modified form of clamp.

In the illustrated embodiment of the invention there is shown a main frame comprising end portions 2 of generally circular form connected by longitudinal members 3 to form a rigid frame. Track rails 4 are provided on the peripheries of the end frames 2 and these are engaged by supporting rollers 5 secured to a base 6. The main frame is rotated by a motor 7 (Figure 4) operating through suitable reducing gearing 8 to drive a pinion 9 which engages a gear segment 10 on the main frame.

The main frame carries a cradle 11 which is generally L-shaped in cross section and which rests on the frame members 3 when the car dumper is in the normal position shown in the drawings. The main frame is provided with rollers 12 over which the cradle 11 is adapted to travel in a limited amount.

The cradle 11 comprises base members 13 and upstanding members 14 connected by an angular plate portion 15. The upstanding members 14 are covered with a plate structure 16 which forms the spill plate over which the material is dumped.

Mounted on the cradle members 13 is a platen 17 provided with wheels 18 suitably guided on the cradle 11 to permit sidewise movement of the platen. The platen is provided with rails 19, which, when the platen is in the normal position of the drawings, forms a continuation of stationary tracks 20 by which cars are delivered to and taken from the car dumper. The rails 19 are definitely aligned with the rails 20 by suitable stops for the platen. One of these stops comprises the walkway 21 which is secured to the cradle and extends longitudinally of the dumper and the other stop comprises fixed members 22 secured to the foundation F. The members 22 do not directly engage the platen 17 but bear against the outer ends of levers 23 and 23ª which are pivoted to the platen at 24 and 24ª. Figure 2 clearly shows how the stops 21 and 22 are effective for aligning the rails 19 with the tracks 20.

The car dumper is provided with clamp members 25, 26, 27 and 28. Each of these clamps is similar in construction and a description of one will suffice for all. Each clamp comprises a leg 29 slidably mounted in guides 30 secured to the upstanding portion 14 of the cradle 11. The clamp is further provided with an outwardly projecting portion having faces 31 adapted to engage the top edges of a car C and provided with a recessed portion 32 which enables the clamp to engage the car in spite of the piling of material higher than the car sides.

The clamps 25 and 26 are operatively connected to the lever 23 and the clamps 27 and 28 are similarly connected to the lever 23ª for securing a preliminary movement of the clamps.

Referring to Figure 1, which shows the connection between the lever 23 and the clamp 26, it will be seen that a cable 33 is dead ended on the back of the clamp at 34, the plate 16 being interrupted behind the leg 29 of the clamp to permit of this connection and also of movement thereof. The cable 33 extends from the dead end 34 over a sheave 35 and thence to a sheave 36 on the upper end of a bell crank lever 37. The cable passes around the sheave 36 to a sheave 38 which is mounted on the cradle 11 and then back over a sheave 39 on the bell crank lever 37 to a sheave 40 and then passes downwardly and is dead ended on the clamp 25. The bell crank lever 37 is pivoted in the cradle 11 at 41 and it will be seen that counterclockwise movement of the lever will be effective for lowering the clamps 25 and 26 while the arrangement of ropes and pulleys constitutes an equalizing arrangement. The clamps are each provided with stops 42. When the lever 37 is moved in a clockwise direction the clamps 25 and 26 will be urged upwardly. Generally speaking, both clamps will rise together, but if one of them should stick the other one will rise until its stop engages the guides 30 and then the other one will also be raised.

The bell crank lever 37 has a generally horizontal arm 43 which is connected by links 44 to one arm of a second bell crank lever 45. This bell crank is pivoted in the cradle 11 at 46 and is connected by links 47 to the lever arm 23. A similar arrangement is provided between the clamps 27 and 28 and the lever 23ª.

The cradle 11 is provided with stops 48 which are adapted to engage the side of the car C and thus limit the sidewise movement of the platen 17. It will be clear that if the platen 17 is moved sidewise from its original position the lever 37 will be free to move counterclockwise and the clamps will travel toward the car by reason of their own weight. The mechanism so far described is simply for the purpose of securing this preliminary movement and does not in any way act to clamp the car.

Each clamp is provided with a link 49 secured to the leg 29 of the clamp at 50 and having a slotted lower end portion 51. This lower end portion engages the hooked end of a lever 52 which is pivoted, not in the cradle 11, but in the main frame at 53. The slotted end portion 51 of the lever provides a lost motion which permits the clamp to move down when the lever 37 is rotated counterclockwise and pins 54 are provided on the lever to insure that the link 49 will always properly engage the lever 52.

The other end of the lever engages the slotted end 55 of a link 56 which extends upwardly and is pivotally secured to a lever 57 which is pivoted to the cradle 11 at 58. Pins 54ª are provided on the lever for maintaining the desired relation between the link 56 and the lever 52.

Passing by for a moment the action of the lever 57 and considering it as being fixed in the position shown in Figure 1, which is true so far as the preliminary movement of the clamps due to the rope and lever system is concerned, it will be seen that the slotted portions 51 and 55 of the links 49 and 56 provide ample lost motion to permit the preliminary downward movement of the clamps. In actual operation the lost motion will be first taken up in the slotted portion 55 due to the superior weight of the end of the lever which cooperates with the link 51, but the requirements of space make it desirable to divide the entire lost motion between the two links as shown so that after the lost motion in the link 56 has been taken up the remaining lost motion is provided for in the link 49.

A pair of downwardly extending rods 59 is pivoted at the end of the lever 57. These rods pass through a guide plate 60 secured to the main frame and are freely slidable therethrough (Figure 3). A compression spring 61 surrounds each of the rods 59 and the springs are enclosed in a spring box 62 secured to the back of the cradle 11.

The outer end of the lever 57 engages a backwardly extending ledge 63 on the cradle 11 and, as will be seen from Figures 1 and 3, the force of the springs is thereby applied to the cradle and tends to move it in a direction perpendicular to the plane of the rails. In practice the springs 61 are made of such size that they very nearly counterbalance the weight of the cradle with its platen and clamping means.

The operation of the car dumper is as follows:—A car is run onto the platen 17 and the motor 7 is operated to rotate the main frame in the direction of the arrow in Figure 1. This tilts the entire cradle 11 and the tendency of the platen 17 is to roll on its wheels 18 toward the spill plate. Such motion, however, is effectually prevented by the stops 22 but the continued rotation of the main frame causes the platen to move relatively nearer to the plane of the spill plate 16 and since the fulcrum 46 of the bell crank lever 45 is moving relatively nearer the platen 17 the bell crank levers 45 and 37 are free to rotate counter-clockwise and the clamps are free to move by their own weight toward the top of the car C.

The relative movement of the platen and the cradle continues until the side of the car C engages the stops 48 and continued rotation of the dumper is then effective for freeing the stops 22 of the load communicated through the levers 23 from the platen 17. The links 23 and 23ª now rotate around their pivot points 24 and 24ª away from the platen 17 as the platen moves away from the stops 22 and the clamps thus move down into engagement with the top of the car C. Coil springs 64 are secured to the under side of the platen and are connected to the levers 23 and 23ª at 65. These coil springs are not of sufficient strength to overcome the weight of the clamps, but they serve to provide a slight resistance to the movement and thus keep lost motion out of the rope and lever system and prevent the ropes from jumping out of the sheaves.

During the above described movement the link 56 and its lever 57 are unaffected but the link 49 moves downwardly and the divided ends 51 and 55 of the links provide the lost motion necessary for the preliminary movement of the clamps.

It will be seen that when a full car is placed on the car dumper there will be a downward force in opposition to the power of the springs 61 consisting of the combined weight of the cradle 11 with its associated apparatus and the car with its contained material. Now as the car dumper is rotated this weight still acts downwardly but the full power of the springs is still exerted along their axes. A component of the weight of the car and the cradle will be taken by the rollers 12 and there will remain a component which is parallel to the direction in which the springs exert their force. This last component will constantly diminish as the car dumper is turned further and further over, and finally it will reach a point where it is overcome by the power of the springs. At this moment the entire cradle with the loaded car thereon will be moved outwardly with respect to the main frame 3 until the motion is retarded by the clamps and the associated lever system.

Bearing in mind that the clamps are resting on top of the car, and also bearing in mind that the lever 52 is pivoted in the main frame, it will be seen that when the cradle 11 moves outwardly the lost motion in the links 49 and 56 will be taken up and the entire cradle will be projecting outwardly from the main frame with the clamps in engagement with the car and with an unyielding connection between the levers 57 and their corresponding clamps. The apparatus is now in a position where the weight of the car is effective for exerting the clamping power which is necessary to hold the car to the rails when further rotation turns the car to such position that the members 14 pass the horizontal position and their upper ends (as viewed in the drawings) are pointed downwardly. When this position of the apparatus is reached the entire cradle 11 with the car communicating its weight through the stops 48 tends to roll downhill on the rollers 12. This of course means that the pivot point 58 tends to move in the direction of the arrow $a$. The power of the springs 61 is such that the outer end 57' of the lever is still urged outwardly and a force is therefore applied through the link 56, the lever 52 and the link 49 to the clamp 26 urging it toward the platen 17 and securely holding the car in place.

During this operation a balance on the springs 61 is achieved and the portion 63 of the cradle moves out of contact with the end 57' of the lever 57 and remains out of engagement during the remainder of the dumping operation. While the car is being dumped the clamping system is thus in a state of equilibrium, the outward component of the weight of the car and cradle being balanced by the compression load on the springs, and in consequence the clamps are capable of quickly adjusting themselves to any change in conditions.

Continued rotation of the main frame increases the downward inclination of the cradle members 14 and therefore increases the clamping power. As the movement progresses the material falls from the car and travels over the spill plate 16 to be discharged into hoppers 66 built into the foundation, from which the material may be taken in any desired manner. Stops 67 are provided for limiting the rotation of the main frame.

The empty car is returned to its original position by reversing the motor 7 and rotating the main frame in the opposite direction. Nothing occurs until the cradle members 14 again pass through a horizontal position and their outer ends are inclined upwardly, at which time the cradle and the car tend to run downhill, thus releasing the tension on the links 56 and 49 and removing the clamping force. At this time the weight of the car and the cradle again has a component in opposition to the springs 61 and this component increases in value until the power of the springs is overcome and the cradle moves downwardly against the frame members 3. At this time the levers 23 and 23ª are lying spread away from the platen 17 and the platen 17 in turn is spaced away from the walkway 21. Continued rotation of the dumper brings the arms 23 and 23ª into engagement with the stationary members 22 and the levers are rotated against the platen, thus causing the bell crank 37 to rotate in a clockwise direction and lift the clamps away from the car. When the levers 23 and 23ª are moved into contact with the platen 17 further rotation of the dumper is effective for moving the platen toward the walkway 21 until finally the parts are restored to their original position. Stops 68 (Figure 5) are provided for limiting the motion of the car dumper in this direction.

An important advantage of the spring and lever arrangement for actuating the clamps is the fact that the springs provide a yielding connection between the cradle and the clamps. It frequently happens that a large lump of coal is caught under a clamp and is not dislodged until the car is partly dumped. The particular clamp which is thus effected exerts its clamping action through the lump of coal and other clamps are not effected in their action. If the lump should become dislodged during the dumping, the springs 61 will suitably actuate the levers to bring the clamp into engagement with the car proper and its effectiveness will thus continue. In other words, the clamps are capable of "following up" at any time during the dumping operation. Another material advantage of the arrangement will be appreciated when it is considered what happens to the car springs and the car body during dumping. Assuming a 100 ton capacity car weighing 60,000 pounds to have a body which weighs 40,000 pounds, it will be seen that the springs between the car body and the trucks are compressed to 240,000 pounds when the loaded car is placed on the dumper. If perfectly rigid clamps were brought tight against this car body and locked in that position while the springs were still compressed by this 240,000 pound load and the car were then inverted, the clamps would be called upon to support a load consisting of the 40,000 pounds car body plus the 240,000 pounds spring pressure amounting in all to several times the weight of the empty car.

With the present clamping mechanism the clamps do not have full pressure applied to them until the car has been rotated sufficiently to free its springs of at least the larger part of their original load, but in case the car body should catch in some manner on the stops 48 which might prevent the car springs expanding as the dumper rotated to the horizontal position and if the car body should free itself from this irregularity with further rotation, thus permitting the car springs to elongate, this additional load between the clamp and the platen tending to separate them would require only a slight movement of the levers and the clamp until the parts were readjusted.

It will be noted that the clamps are connected to the springs 61 through a multiplying lever system. This is of value because by providing a suitable mechanical advantage for these levers the clamping force can be made any desired proportion of the weight of the entire assembly and car which rest on the rollers 12. A further advantage of the lever arrangement is that the slack or lost motion which is present in the apparatus by reason of the rope and lever system for preliminarily moving the clamps is very rapidly taken up, for instance, with levers whose long and short arms are in the ratio of 2 to 1, in each case, 1 inch of outward travel of the cradle takes up the slack produced by 3 inches of the original lowering of the clamps toward the car.

Referring to Figure 2, it will be noted that the roller 12ª is provided with flanges 12ᵇ while the remaining rollers 12 are unflanged. The flanges 12ᵇ effectually prevent endwise movement of the cradle with respect to the main frame but at the same time a certain freedom of angular shifting of the cradle with respect to the main frame is permitted. This is desirable because unequal movement of the various clamps due to the presence of lumps of coal under the clamps or to other causes will result in unequal load conditions on the various springs 61 and the consequent tendency to shift the cradle out of its normal position. The cause of this tendency, the clamp operating means, are located in a plane substantially longitudinal with respect to the car and the cradle. By such arrangement the tendency of the various parts to bind is eliminated and the apparatus operates freely at all times.

Figure 6 shows a modified form of clamp wherein there is provided a clamping beam 25ª which is pivoted to the clamp structure at 25ᵇ. This arrangement automatically takes care of cars whose tops are uneven and is of particular value in connection with the yielding spring means provided in the clamp operating system.

A material advantage of the spring counterbalance system employed is the fact that the springs act as a cushioning means for the movable support when the dumper is being returned to its original position. As heretofore explained the entire cradle with the car thereon is moved outwardly by the springs before the members 14 are rotated past a horizontal position, this movement being occasioned by the decrease in value of the component of weight of cradle plus car along the line of action of the spring. When a car has been emptied the cradle is spaced away from the frame members 3 and it returns to its original position resting on these frame members after the cradle members 14 have passed through a horizontal position on the return travel. Upon such travel the springs are compressed and materially reduce the shock incident to the movement of the cradle back to its original position.

I have illustrated a preferred embodiment of the invention, but it will be understood that it is not limited to the form shown. For example, the main frame may be rolled along a trackway instead of being rotated if it is desired to dump the car at a distance from the tracks. I have used the term "clamp" or "clamping means" as a term of definition and not of limitation and intend it to include not only the form of clamp shown, but any other holding means which may be employed to secure the car during the dumping operation. Various other changes may be made in the apparatus without departing from the invention as defined in the following claims.

I claim:

1. A car dumper, comprising a frame, car supporting means relatively movable with respect to the frame, and car clamping means actuated upon such relative movement.

2. A car dumper, comprising a frame, car supporting means relatively movable with respect to the frame, balance means for the support, and car clamping means actuated by the balance means.

3. A car dumper, comprising a frame, car supporting means thereon movable in a plurality of directions with respect to the frame, car clamping means, means operable upon movement of the car supporting means in one direction and effective for causing a preliminary movement of the clamping means, and means operable upon movement of the car supporting means in another direction for causing the clamping means to exert a clamping action.

4. A car dumper, comprising a frame, car supporting means relatively movable with respect to the frame, balance means for the support, and car clamping means actuated upon such relative movement, the car clamping means being connected with the balance means.

5. A car dumper, comprising car supporting means permitting movement of a car to be dumped, and car clamping means movable toward the car and actuated by the movement of the car.

6. A car dumper, comprising car clamping means movable toward the car and actuated by the weight of the car being dumped.

7. A car dumper, comprising supporting means permitting movement of the car to be dumped, a member movable with the car, and car clamping means operatively connected to the member.

8. A car dumper, comprising car supporting means permitting movement of the car to be dumped, clamping means for the car, means operable upon such movement of the car for bringing the clamping means into engagement with the car, and means actuated by the weight of the car for providing the clamping force.

9. A car dumper, comprising car supporting means permitting movement of the car to be dumped, clamping means for the car, means operable upon such movement of the car for bringing the clamping means into engagement with the car, and means engaging the car and operatively connected to the clamping means for providing the clamping force.

10. A car dumper, comprising car supporting means, a car clamp, spring means for moving the clamp into engagement with the car, and means actuated by the weight of the car for providing the clamping force.

11. A car dumper, comprising a support, a platen thereon adapted for sidewise movement relative to the support, clamping means for the car, and a connection between the platen and the clamping means for moving the same upon such relative sidewise movement.

12. A car dumper, comprising a support adapted for sidewise movement relative to a car thereon, clamping means for the car, and means for moving the clamping means upon such relative sidewise movement.

13. A car dumper, comprising a support adapted for sidewise movement relative to a car thereon, a plurality of clamping means for the car, means common to the several clamps for moving them upon such relative sidewise movement, and an equalizer for the clamp moving means.

14. A car dumper, comprising a support adapted for sidewise movement relative to a car thereon, clamping means for the car, a lever adapted to be moved upon such sidewise movement, and a flexible connection between the lever and the clamping means.

15. A car dumper, comprising a tiltable frame, a relatively movable support thereon adapted to receive a car, clamping means carried by the support, and clamp moving means carried by the support and actuated when the frame is tilted.

16. A car dumper, comprising a tiltable frame a relatively movable support thereon adapted to receive a car to be dumped, clamping means on the support, means carried by the support for moving the clamp when the frame is tilted, and counterbalance means for the support, the counterbalance means being connected to the clamping means and effective for applying a force thereto.

17. A car dumper, comprising a frame, a relatively movable support, a clamp carried by the support and relatively movable with respect thereto, and a clamping connection between the support and the clamp, said connection being operable upon movement of the support relative to the frame.

18. A car dumper, comprising a frame, a relatively movable car support, clamping means relatively movable with respect to the supporting means, and a clamp operating connection between the clamp and the supporting means.

19. A car dumper, comprising a frame, a relatively movable car support, clamping means relatively movable with respect to the supporting means, and a clamp operating connection including a member pivoted on the frame.

20. A car dumper, comprising a frame, a relatively movable support, a clamp which is relatively movable with respect to the support, a lever pivoted on the frame, and connections between the lever and the clamp and between the lever and the supporting means.

21. A car dumper, comprising a support, a platen adapted for sidewise movement relative to the support, clamping means for the car, an arm on the platen, and a connection between the arm and the clamping means.

22. A car dumper, comprising a support, a platen adapted for sidewise movement relative to the support, an arm on the platen, a relatively stationary stop for the arm, a stop on the support for limiting the platen movement, clamping means for the car, and a connection between the arm and the clamping means.

23. A car dumper, comprising a support, a platen adapted for sidewise movement relative to the support, an arm on the platen, a relatively stationary stop for the arm, clamping means for the car, and a connection between the arm and the clamping means.

24. A car dumper, comprising a support, a platen adapted for sidewise movement relative to the support, an arm on the platen, clamping means for the car, a connection between the arm and the clamping means, the connection permitting movement of the clamping means into engagement with the car when the arm is moved with respect to the platen and yielding means opposing such movement of the arm.

25. A car dumper, including a support, a platen adapted for movement relative to the support, clamping means for the car, an arm on the platen, a rope and sheave connection between the arm and the clamping means, and yielding means tending to keep the rope system taut.

26. A car dumper, comprising a frame, a car support mounted for movement on the frame in a direction substantially perpendicular to the base of the car, a clamp movable toward the top of the car, and a connection between the clamp and the car support adapted to force the clamp toward the top of the car upon movement of the support on the frame.

27. A car dumper, comprising means for tilting a car, a clamp for engaging the car, and means adapted to engage the car and transmit at least a portion of its weight to the clamp.

28. A car dumper, comprising a tiltable frame, a relatively movable support on the frame, clamp means, and counterbalance means adapted to cause relative movement between the clamp and the support.

29. A car dumper, comprising a tiltable frame, a relatively movable support on the frame, clamp means, counterbalance means adapted to cause relative movement between the clamp and the support, and means adapted to transmit at least a portion of the weight of the car from the support to the clamp.

30. A car dumper, comprising means for tilting a car, a clamp for engaging the car, and means adapted to transmit at least a portion of the weight of the car to the clamp, said means lying generally in a plane which is longitudinal with respect to the car.

31. A car dumper, comprising means for tilting a car, a plurality of spaced apart clamps for engaging the car, and means adapted to transmit at least a portion of the weight of the car to the clamps, said means lying generally in a plane which is longitudinal with respect to the car.

32. A car dumper, comprising a tiltable frame, a relatively movable support, a lever on the frame, a clamp on the support relatively movable with respect to the support, means connecting the lever to the clamp and the support, and yielding means associated with the connecting means.

33. A car dumper, comprising a tiltable frame, a relatively movable support, a plurality of clamps on the support relatively movable with respect to the support, a plurality of levers on the frame, means connecting the several clamps to the levers, and yielding means associated with at least one of the connecting means.

34. A car dumper, comprising a tiltable frame, a relatively movable support, a plurality of clamps on the support relatively movable with respect to the support, a plurality of levers on the frame, means connecting the several clamps to the levers, and yielding means associated with at least one of the connecting means, the connecting means lying generally in a plane longitudinal of the car being dumped.

35. A car dumper, comprising a tiltable frame, a relatively movable support, a lever on the frame, a clamp on the support relatively movable with respect to the support, means connecting the lever to the clamp and support and adapted to cause movement of the clamp upon movement of the support, and means for moving the clamp independently of the support, the connecting means being so arranged as to permit such movement.

36. A car dumper, comprising a tiltable frame, a relatively movable support, a lever on the frame, a clamp on the support relatively movable with respect to the support, means connecting the lever to the clamp and support and adapted to cause movement of the clamp upon movement of the support, and means for moving the clamp independently of the support, the connecting means being provided with a lost motion.

37. A car dumper, comprising a tiltable frame, a relatively movable support, a lever on the frame, a clamp on the support relatively movable with respect to the support, a platen on the support adapted for relative sidewise movement, means connecting the lever to the clamp and the support and adapted to move the clamp relative to the support, and means connected with the platen for moving the clamps independently of the support upon such relative sidewise movement, the first mentioned connecting means being so arranged as to permit such movement.

38. A car dumper, comprising a rotatable frame, and a relatively movable car support carried thereby, the car support being adapted for movement relative to the frame upon rotation of the frame and in a direction substantially perpendicular to the base of the car.

39. A car dumper, comprising a rotatable frame, a relatively movable car support, and clamping means for the car, the support being adapted for movement relative to the frame upon rotation of the frame and in a direction substantially perpendicular to the base of the car.

40. A car dumper, comprising a rotatable frame, a relatively movable car support, and clamping means for the car, the support being adapted for outward movement upon rotation of the frame, the clamping means being operatively connected to the support whereby the support is effective for applying clamping force upon such outward movement.

41. A car dumper, comprising a frame, a relatively movable support adapted for movement relative to the frame upon rotation of the frame in a direction substantially perpendicular to the base of the car, and cushioning means for the return movement of the support.

42. A car dumper, comprising a frame, a relatively movable support adapted for outward movement upon rotation of the support, and combined cushioning and counterbalancing means for the support.

43. A car dumper, comprising a rotatable frame and a support thereon adapted for movement relative to the frame and in a direction substantially perpendicular to the base of the car, the frame permitting such movement in different amounts at opposite ends of the frame.

44. A car dumper, comprising a rotatable frame and a support thereon adapted for movement relative to the frame and in a direction substantially perpendicular to the base of the car, the frame permitting such movement in different amounts at opposite ends of the frame, and spaced apart clamping means for a car on the support.

45. A car dumper, comprising a rotatable frame, a support thereon adapted for outward movement upon rotation of the frame, the frame permitting angular displacement of the support with respect to the frame upon such movement, spaced apart clamping means for a car on the support, and connections between the clamping means and the support.

46. A car dumper, comprising a rotatable frame, a support thereon adapted for outward movement upon rotation of the frame, the frame permitting angular displacement of the support with respect to the frame upon such movement, spaced apart clamping means for a car on the support, and connections between the clamping means and the support, at least one of such clamping means having a yielding means associated therewith.

In testimony whereof I have hereunto set my hand.

HANS ENARD.